United States Patent Office 3,414,421
Patented Dec. 3, 1968

3,414,421
SEALING WAX
Merritt A. Robinson, San Anselmo, Calif., assignor to Harold B. Sherfy, San Francisco, Calif.
No Drawing. Continuation-in-part of application Ser. No. 498,115, Oct. 19, 1965. This application Feb. 21, 1967, Ser. No. 617,454
2 Claims. (Cl. 106—173)

ABSTRACT OF THE DISCLOSURE

Sealing wax is provided in which shellac (ordinarily present in sealing wax) is replaced in whole or in part with a cellulose plastic material such as ethyl cellulose. The wax contains substantial quantities of wood rosin, hydrocarbon wax and a filler. A small amount of blending agent is included if the cmoponents are not miscible. A pigment and a scent may be added in a small amount.

This application is a continuation-in-part of my copending application Ser. No. 498,115, filed Oct. 19, 1965, entitled "Sealing Wax," and now abandoned.

This invention relates to novel compositions of matter which are particularly useful as sealing wax.

Heretofore, sealing wax used for sealing envelops and for other like purposes have been prepared from a formula consisting of shellac, resin and waxes, with or without added coloring material, filler and odorant.

Recently machinery has been provided to produce sealing wax and to mold it on an efficient basis. In the use of such machinery, it is necessary to hold substantial quantities of the molten formula at an elevated temperature for a considerable period of time. In general in the production of sealing wax, and more particularly when it is produced in equipment of the type just described, difficulty is encountered due to the instability of shellac, which polymerizes in a short time at a high temperature, such as a pouring temperature of about 300° F. This results in degradation of the product. Also, sealing wax as previously formulated tends to burn with a smoky flame and to drip burning material.

It is an object of the present invention to provide improvements in the art of sealing wax.

It is a particular object of this invention to provide a novel composition for use as a high quality sealing wax, which is more heat stable than previous high quality sealing wax compositions and which does not become degraded when held at a convenient pouring temperature for a substantial period of time.

Another object of the invention is to provide a sealing wax composition which does not burn with a smoky flame and which does not drip burning material, to the extent that sealing wax heretofore has exhibited these drawbacks.

The above and other objects of the invention will be apparent from the ensuing description and the appended claims.

In accordance with the present invention, the shellac component of sealing wax is replaced in whole or in part with a cellulose plastic material typified by ethyl cellulose. A suitable formulation is as follows, parts being percentages by weight.

| Component | Preferred range, percent | Broad range, percent |
|---|---|---|
| Cellulose plastic | 15-25 | 10-35 |
| Wood rosin | 20-30 | 10-40 |
| Hydrocarbon wax | 15-25 | 10-30 |
| Blending agent | 2-5 | 0-10 |
| Filler | 25-45 | 10-60 |
| Pigment or other colorant | 0.5-3 | 0-5 |
| Scent | 0.1-1 | 0-1 |

Referring to the formula above, the cellulose plastic may be any of the common alkyl substituted celluloses such as ethyl cellulose, methyl cellulose and ethyl-methyl cellulose; it may also be nitro cellulose or ethyl hydroxy ethyl cellulose. In general, any modified cellulose may be used wherein ether and/or ester forming groups are incorporated in the cellulose molecule to form ether and/or ester groups and to convert the cellulose to a themoplastic material which can be melted to a fluid, preferably having a viscosity not greater than about 50,000 cps. at a temperature of about 300° F. and which is stable in the molten condition for a sufficient period of time to permit holding and pouring and which will burn without an excessively smoky flame. Ethyl cellulose of the type N and of viscosity grade designation of 7 cps. is an excellent material for this purpose. The G, K and T types may also be used.

The cellulose plastic component of the sealing wax of the present invention is advantageous because it is much more stable and does not polymerize excessively, if at all, at conventional pouring temperatures; it burns without a smoky flame or with a much less smoky flame than shellac; it burns without objectionable odor; and it has high strength characteristics in that it does not fragment easily on impact.

It will be understood with regard to the cellulose plastic component and with regard to other components of the sealing wax compositions of the present invention, that in any given case, for reasons of economy or otherwise, the full advantages of the invention may not be required in all cases. Thus, a material may be selected which provides less than all of the potential advantages, or which provides some one or more of the advantages in a lesser degree than the best material available.

In the sealing wax of the present invention, wood rosin may be used with or without hydrocarbon wax or vice versa but it is preferred to employ a blend of wood rosin and hydrocarbon wax because the hydrocarbon wax imparts good burning quality, for example, it burns without a smoky flame. Wood rosin imparts good melting properties and imparts a good gloss to the finished product. By "good melting properties" is meant the property of gradual transition between the solid and liquid states such that, during cooling, clean signet impressions can be formed on seals produced from the material.

In general any wood rosin (crude or refined, unmodified or modified by polyermization or otherwise) may be used provided it will melt adequately and does not have too dark a color, e.g., has a color not darker than about G on the standard scale of the U.S. Department of Agriculture.

With regard to the hydrocarbon wax, any of the petroleum waxes or paraffin waxes may be used, preferably those having melting points between about 130° and 180° F., preferably about 160° and 165° F. Also, a synthetic hydrocarbon wax may be used instead of or in conjunction with a petroleum wax, for example, waxy polyethylene, polypropylene and the like.

The wood rosin of the present invention may be any wood rosin but preferably it is a refined rosin such as Hercules Polypale (a trademark of Hercules Powder Co.), which is a light colored polymerized wood rosin.

The function of the blending agent is to render compatible those components which are otherwise incompatible or immiscible (or insufficiently miscible) with one another. Thus, ethyl cellulose is insoluble or sparingly soluble in paraffin wax and requires a blending agent. Ethyl hydroxy ethyl cellulose is adequately soluble in wax, hence does not require a blending agent.

Suitable blending agents are stearic acid, other higher fatty acids, castor oil and other fatty oils and synthetic plasticizers and blending agents such as dibutylphthalate, di-octylphthalate, etc. Other suitable blending agents will be found among the plasticizers set forth in Table XIV on pages 29 and 30 of a Hercules Powder Co. publication entitled "Hercules Ethyl Cellulose Properties and Uses," copyright 1962.

Any suitable filler may be used, e.g., calcium carbonate in its various forms such as ground limestone, also ground dolomite, diatomaceous earth and many others. The function of the filler is, as the name indicates, to supplement and extend more expensive components and also to give a desirable hardness to the finished product. A filler such as calcium carbonate which has low absorption for the organic ingredients, is preferred because it alters viscosity of the molten product to a lesser degree.

Any of a large variety of heat stable pigments or other coloring materials and odorants may be added, usually in very small quantity, to achieve whatever color and/or odor is desired.

The following specific example will further illustrate the practice and advantages of the present invention.

EXAMPLE 1

The formulation used was as follows:

| | Pounds |
|---|---|
| Ethyl cellulose N-7 | 25 |
| Wood rosin (Polypale, a product of Hercules Powder Co.) | 25 |
| Paraffin wax, 160-165 M.P. | 17 |
| Polyethylene AC-6 (a product of Allied Chemical Company) | 4 |
| Stearic acid | 2½ |
| Finely ground calcium carbonate | 25 |
| Pigment as desired. | |
| Scent | ½ |

The paraffin wax, polyethylene, stearic acid and calcium carbonate were added to a clean pot and heat was applied to melt the mixture. When this charge was nearly melted a mixer was started at slow speed. The wood rosin was added immediately while mixing and the application of heat continued. When the wood rosin was fully melted and dispersed, one-half of the ethyl cellulose was added and mixing was continued until the mass had a smooth, creamy texture. Then the remainder of the ethyl cellulose was added and the speed of mixing was increased and the mixing blade was raised enough to agitate the surface of the liquid and to form a vortex. The pigment was then added. The scent was added just before molding. The material was molded into sticks and into other desired shapes.

EXAMPLE 2

The formulation in this example differs from that in Example 1 primarily in the use of a greater amount of filler and a smaller amount of ethyl cellulose. The formulation was as follows:

| | Pounds |
|---|---|
| Ethyl cellulose N-7 | 12½ |
| Wood rosin (as in Ex. 1) | 25 |
| Paraffin wax (as in Ex. 1) | 16½ |
| Polyethylene (as in Ex. 1) | 4 |
| Stearic acid | 3½ |
| Finely ground calcium carbonate | 50 |
| Pigment and scent as desired. | |

Sticks of this sealing wax will melt in a common candle flame and will burn like a candle without a smoky flame, with a pleasant odor and with no objectionable soot; they will drip slowly and without forming burning drops; they are hard and glossy with a plastic feel; and a seal formed from the stick is slightly brittle so that it can be broken when desired but it will not crumble when broken. In this formulation, the polyethylene serves to raise the melting point of the paraffin wax, thereby avoiding excessive dripping.

The sticks may be provided with wicks so that they can be burned like candles; or the sticks may be without wicks. The sealing wax may also be molded into other shapes. The sealing wax may also be applied by means of a glue spreading gun, which is a well known device in which a quantity of glue (in the case of the present invention, a quantity of wax) is heated electrically and applied.

I claim:

1. A sealing wax composition which, at room temperature is hard, slightly brittle and capable of being broken without crumbling and which will melt in a common candle flame, said wax composition consisting essentially of the following ingredients in the following approximate percentages by weight:

| | |
|---|---|
| Ethyl cellulose | 10-25. |
| Wood rosin | 20-30. |
| Normally solid paraffin wax | 15-25. |
| Inorganic mineral filler | 25-45. |
| Blending agent | Quantity sufficient to render the ethyl cellulose and paraffin wax mutually soluble. |

2. The sealing wax composition of claim 1 wherein the ethyl cellulose is N grade, the wood rosin is refined wood rosin, and the paraffin wax has a melting point of 160-165° F.

References Cited

UNITED STATES PATENTS

| 2,297,709 | 10/1942 | Kauppi | 106—191 |
| 2,311,609 | 2/1943 | Kauppi | 106—191 |
| 2,413,011 | 12/1946 | Taylor | 106—191 |
| 2,537,983 | 1/1951 | Franklin | 106—191 |
| 2,933,989 | 4/1960 | D'Adrian | 106—191 |

FOREIGN PATENTS

| 325,014 | 1930 | Great Britain. |

OTHER REFERENCES

Chemistry and Technology of Waxes, by Warth, 1956, pp. 690 and 845, Reinhold Publishing Co.

Commercial Waxes, Bennett, 1956, pp. 260, 261, 371, 373, 483 and 484, Chemical Publishing Co.

Industrial Waxes, by Bennett, vol. 2, 1963, pp. 58, 59, 66, and 67, Chemical Publishing Co.

MORRIS LIEBMAN, *Primary Examiner.*

H. H. FLETCHER, *Assistant Examiner.*